United States Patent [19]
Baugher et al.

[11] Patent Number: 5,634,006
[45] Date of Patent: May 27, 1997

[54] SYSTEM AND METHOD FOR ENSURING QOS IN A TOKEN RING NETWORK UTILIZING AN ACCESS REGULATOR AT EACH NODE FOR ALLOCATING FRAME SIZE FOR PLURAL TRANSMITTING APPLICATIONS BASED UPON NEGOTIATED INFORMATION AND PRIORITY IN THE NETWORK

[75] Inventors: Mark J. Baugher; John K. Bigler; Mark R. Simpson, all of Austin, Tex.

[73] Assignee: International Business Machines Corporation, Armonk, N.Y.

[21] Appl. No.: 540,923

[22] Filed: Oct. 11, 1995

Related U.S. Application Data

[63] Continuation of Ser. No. 930,587, Aug. 17, 1992, abandoned.

[51] Int. Cl.$^6$ .............................. G06F 15/16; H04L 12/42
[52] U.S. Cl. ..................... 395/200.06; 395/200.21; 370/455
[58] Field of Search ............... 370/85.5, 82; 395/200.06, 395/200.12, 200.17, 200.2, 200.21

[56] References Cited

U.S. PATENT DOCUMENTS

| | | | |
|---|---|---|---|
| 4,389,720 | 6/1983 | Baxter et al. | 370/62 |
| 4,404,557 | 9/1983 | Grow | 340/825.25 |
| 4,587,651 | 5/1986 | Nelson et al. | 370/88 |
| 4,747,130 | 5/1988 | Ho | 379/269 |
| 4,771,391 | 9/1988 | Blasbalg | 364/514 C |
| 4,825,434 | 4/1989 | Shaio | 370/80 |
| 4,864,562 | 9/1989 | Murakami et al. | 370/84 |
| 4,905,231 | 2/1990 | Leung et al. | 370/94 |
| 4,914,650 | 4/1990 | Sriram | 370/60 |
| 4,953,159 | 8/1990 | Hayden et al. | 370/62 |
| 4,980,886 | 12/1990 | Bernstein | 370/80 |
| 4,998,248 | 3/1991 | Matsuzaki | 370/110.1 |
| 5,008,926 | 4/1991 | Misholi | 379/89 |
| 5,029,164 | 7/1991 | Goldstein et al. | 370/95.1 |
| 5,031,089 | 7/1991 | Liu et al. | 364/200 |
| 5,050,161 | 9/1991 | Golestani | 370/60 |
| 5,115,430 | 5/1992 | Hahne et al. | 370/85.5 |
| 5,121,383 | 6/1992 | Golestani | 370/60 |
| 5,164,938 | 11/1992 | Jurkevich et al. | 370/60 |
| 5,193,090 | 3/1993 | Filipiak et al. | 370/94.1 |
| 5,245,605 | 9/1993 | Ofek | 370/85.12 |

OTHER PUBLICATIONS

IBM Technical Disclosure Bulletin, vol. 31, No. 11, Apr. 1989, p. 349, "Managing Serial Use Resources in a Distributed Data Processing System Using an Insertion Ring".

IBM Technical Disclosure Bulletin, vol. 34, No. 4B, Sep., 1991, pp. 416–417, "Inter–Client Resource Usage in Distributed Client–Server Presentation Manager System".

(List continued on next page.)

*Primary Examiner*—Thomas C. Lee
*Assistant Examiner*—D. Dinh
*Attorney, Agent, or Firm*—David A. Mims, Jr.; Keith Stephens

[57] ABSTRACT

A data processing system for regulating access to a communication network is disclosed herein. The data processing system employs a component that can be implemented in hardware logic or software. The component regulates access to the priority queue or transmit channel that is attached to the shared medium local area network section. All access to the priority queue or transmit channel must pass through this component, thus subjecting all communication transactions to rejection or tracking by the component. The component allocates a frame size based on the information to be transmitted and the priority to assure the transmission will be completed in line with the quality of service required. The component monitors the rate and size of messages to assure that an application's actual throughput does not exceed its negotiated throughput. The component, moreover, is capable of operating in correction mode where throughput and frame size violations are prevented and reported. Alternatively, the component operates in detection mode where violations are recorded and reported to an application.

19 Claims, 7 Drawing Sheets

OTHER PUBLICATIONS

"Token-Ring Newtork", Architecture Reference, IBM, Third Edition, Sep. 1989.

ISO/IEC JTC 1/SC 21 N 3294, Jan., 1989; Project: JTC1.21.28.1—"DP 10041: Information Processing Systems—Open Systems Interconnection—Systems Management Overview".

ISO/IEC JTC 1/SC 21/N 3313, Jan. 18, 1989; Project: JTC1.21.28—"Information Processing—Open System Interconnection—Performance Management Working Document".

ISO/IEC JTC 1/SC 21/WG4 N 3311, Jan. 16, 1989; Project: 97.21.28—"Information Processing—Open System Interconnection—Working Draft of the Configuration Management Overview", Gordon S. Little, Editor.

ISO/IEC JTC 1/SC 21/N 3314, Dec. 1988; Project: 97.21.28—"Information Processing—Open Systems Interconnection Accounting Management Working Document".

ISO/IEC JTC 1/SC 21 N 3312, Jan., 1989; Project: JTC1.21.28—"Information Processing Systems—Open Systems Interconnection—Systems Management—Fault Management Working Document".

ISO/IEC/DIS 7498-4, Jan. 21, 1988; "Information Processing Systems—Open Systems Interconnection—Basic Reference Model—Part 4: Management Framework".

ISO/IEC JTC 1/SC 21 N 3324, Jan. 1989; Project: JTC1.21.28—"Working Draft For Structure of Management Information—Part 1: Management Information Model".

ISO/IEC JTC1/SC21 N 3302, Jan. 1989; Project: JTC1.21.28—"Information Processing Systems—Open Systems Interconnection—Structure of Management Information—Part 3: Definitions of Management Attributes".

ISO/JTC1/SC21 N 3437, Feb. 10, 1989; Project: 97.21.14—"Information Processing—Open Systems Interconnection—Management Information Services—SMI Part 4: Guidelines for the Definition of Managed Objects".

*Business Communications Review*, Apr. 1992, "Can Fractional T3 Make it to the Marketplace?", pp. 45–50.

Aicardi et al. "Optimization of Capacity Allocation Among Users and Services in Integrated Networks", Communication, 1990 IEEE International Conf. 1990.

S1 TRANSMITS ITS FRAME AT NORMAL PRIORITY, USING THE RECEIVED TOKEN.

FIG. 4A

S5 RESERVES A HIGHER PRIORITY IN THE PASSING FRAME.

FIG. 4B

S1 REMOVES ITS FRAME, ORIGINATES A TOKEN OF THE PROIRITY THAT S5 RESERVED, AND ENTERS PRIORITY-HOLD STATE (DENOTED BY *).

FIG. 4C

S2, S3, AND S4 HAVE NO PRIORITY TRAFFIC, AND THE TOKEN MAKES ITS WAY TO S5.

FIG. 4D

SMAE = SYSTEMS MANAGEMENT APPLICATION ENTITY
LME = LAYER MANAGEMENT ENTITY
LE = LAYER ENTITY

SYSTEM AND METHOD FOR ENSURING QOS IN A TOKEN RING NETWORK UTILIZING AN ACCESS REGULATOR AT EACH NODE FOR ALLOCATING FRAME SIZE FOR PLURAL TRANSMITTING APPLICATIONS BASED UPON NEGOTIATED INFORMATION AND PRIORITY IN THE NETWORK

This is a continuation of application Ser. No. 07/930,587 filed Aug. 17, 1992, now abandoned.

FIELD OF THE INVENTION

The present invention relates to data processing systems, and in particular to managing priority for a communication network.

BACKGROUND OF THE INVENTION

It is known for self-contained computer workstations to be interconnected by a digital network. One advantage of such a network is that users of individual workstations can communicate with one another over the network, for example by means of a typed note, a data file or a program file transmitted to another user. More recently, users have increasingly requested desktop conferencing, remote presentations and other multimedia applications between networked users. However, multimedia applications require high bandwidth communication links between distributed computing systems with minimal communication delay, maximum throughput, and instantaneous burst communication capability. The requirements of multimedia applications make scheduling the appropriate resources difficult.

IBM Technical Disclosure Bulletin (TDB), number 4b, September, 1991, pp. 416–417, *Inter-client Resource Usage in Distributed Client Server Presentation Manager System*, discloses a distributed client-server presentation system. In such a system, resources, such as cut and paste clipboard, the keyboard, the mouse, etc., are managed across a number of client systems each connected to a display server. The resources are managed by providing generic server functions, neutral to any specific client policies. The Server provides inter-client resource support by managing named "logical resources." Clients use these resources to assign global ownership. For example, assuming a client system, a "FOCUS" resource is created and ownership is acquired by client nodes which require a focus window to receive keyboard input events. The Client requests a resource by name and can request exclusive or shared access. Data can also be associated with a logical resource.

Another IBM TDB, Apr. 4, 1989, p. 349, *Managing Serial Use Resources in a Distributed Data Processing System Using an Insertion Ring*, discloses a technique which insures that users of serial facilities in a distributed data processing system are properly sequenced. U.S. Pat. No. 5,031,089; *Dynamic Resource Allocation Scheme for Distributed Heterogeneous Computer Systems;* discloses a similar system for a plurality of networked computer nodes to reallocate system resources for optimized job performance. U.S. Pat. No. 4,747,130; *Resource Allocation In Distributed Control Systems;* discloses a similar scheduling system for a distributed process control system.

U.S. Pat. No. 4,953,159; *Audiographics Conferencing Arrangement;* discloses a system for allowing conferees to exchange displayed text and/or graphics stored locally in their respective data terminals. The conferees may change the displayed text and/or graphics and such changes are automatically distributed to the other data terminals so that all of the conferees view the same information.

U.S. Pat. No. 4,389,720; *Distributed Digital Conferencing System;* discloses a time division communication system for combining those samples going to a particular station forming a conference with combinations of selected time slot samples into a conference sum unique to the station.

Resource reservation must occur at all layers of what is known as the Open Systems Interconnect (OSI) model. At the network layer, a circuit may need to be reserved, for a particular time, through a plurality of intermediate network computer nodes. At the lower layers, the system must ensure that a particular resource managed by the layer can be reserved. At the Medium Access Control (MAC) layer of Fiber Distributed Data Interface (FDDI), a Synchronous FDDI standard of the FDDI Station Manager SMT7.1 describes how a FDDI workstation can communicate bandwidth reservation needs to a plurality of workstations connected to a FDDI ring, and how the negotiated Token holding time and Token Rotation Time can be negotiated by the stations to either grant or deny the bandwidth request of a particular station.

No such standard exists for an IEEE or IBM Token Ring, but there is an architected priority mechanism in the Token Ring and the Token Bus whereby a station on the ring with a high (non-zero) priority frame to send can indicate this in the access control (AC) field of a passing frame, provided that the value of the access field is less than the priority at which the station desires to initialize the AC. When a station sending the frame releases the token, it releases the token at the priority of the AC field, and eventually sets it back to its original priority as specified in the IEEE 802.5 medium access control protocol. The IEEE 802.5 standard and the IBM 802.5 implementation merely specifies the protocol for increasing and decreasing priority, but each station is unconstrained in its use of priority beyond this protocol.

U.S. Pat. No. 5,029,164 describes a network (source to destination) bandwidth reservation algorithm including messages exchanged between source, intermediate and destination nodes. Internet Requests For Comments (RFC) #1190, Experimental Internet Stream Protocol describes a message exchange protocol across a network; like U.S. Pat. No. 5,029,164, RFC 1190 describes message exchanges between a source, destination, and intermediate nodes. But does not solve the specific problems of reserving bandwidth on networks that have shared access and an architected priority mechanism such as the Token Ring.

U.S. Pat. No. 4,587,651 discloses bandwidth reservation on a ring having two network loops, but a slotted, time division multiplexed scheme is used that is unsuitable for asynchronous rings and buses that have architected priority mechanisms for bandwidth reservation, and which lack the necessary physical network clocking required by TDM schemes.

U.S. Pat. No. 5,050,161 describes a scheduling system in source, destination and intermediate computer network nodes which can provide throughput, delay and delay jitter (variation in delay) guarantee. But this patent requires that all packets having a certain quality of service guarantees be assigned a time slot which is unique to the station (it is not TDM, time division multiplexed) and transmitted at the start of the time slot. This scheme requires that connections be identified and is thus not suitable for the medium access control layer which does not recognize connections; it does not contain arbitration among a plurality of computer network nodes sharing a common transmission medium, such as a Token Ring, and it does not specify how priority can be used to implement bandwidth reservation on a shared transmission medium.

Prior to this invention, no means existed for allowing Token Ring priority to guarantee bandwidth and delay times.

SUMMARY OF THE INVENTION

According to the present invention there is provided a data processing system for regulating access to a communication network.

These and other objects of the present invention are accomplished by the operation of a component that can be implemented in hardware logic or software. The component regulates access to the priority queue or transmit channel that is attached to the shared medium local area network section. All access to the priority queue or transmit channel must pass through this component, thus subjecting all communication transactions to rejection or tracking by the component. The component allocates a frame size based on the information to be transmitted and the priority to assure the transmission will be completed in line with the quality of service required.

The component monitors the rate and size of messages to assure that an application's actual throughput does not exceed its negotiated throughput. The component, moreover, is capable of operating in correction mode where throughput and frame size violations are prevented and reported. Alternatively, the component operates in detection mode where violations are recorded and reported to an application.

DETAILED DESCRIPTION OF THE INVENTION

Figure 1:
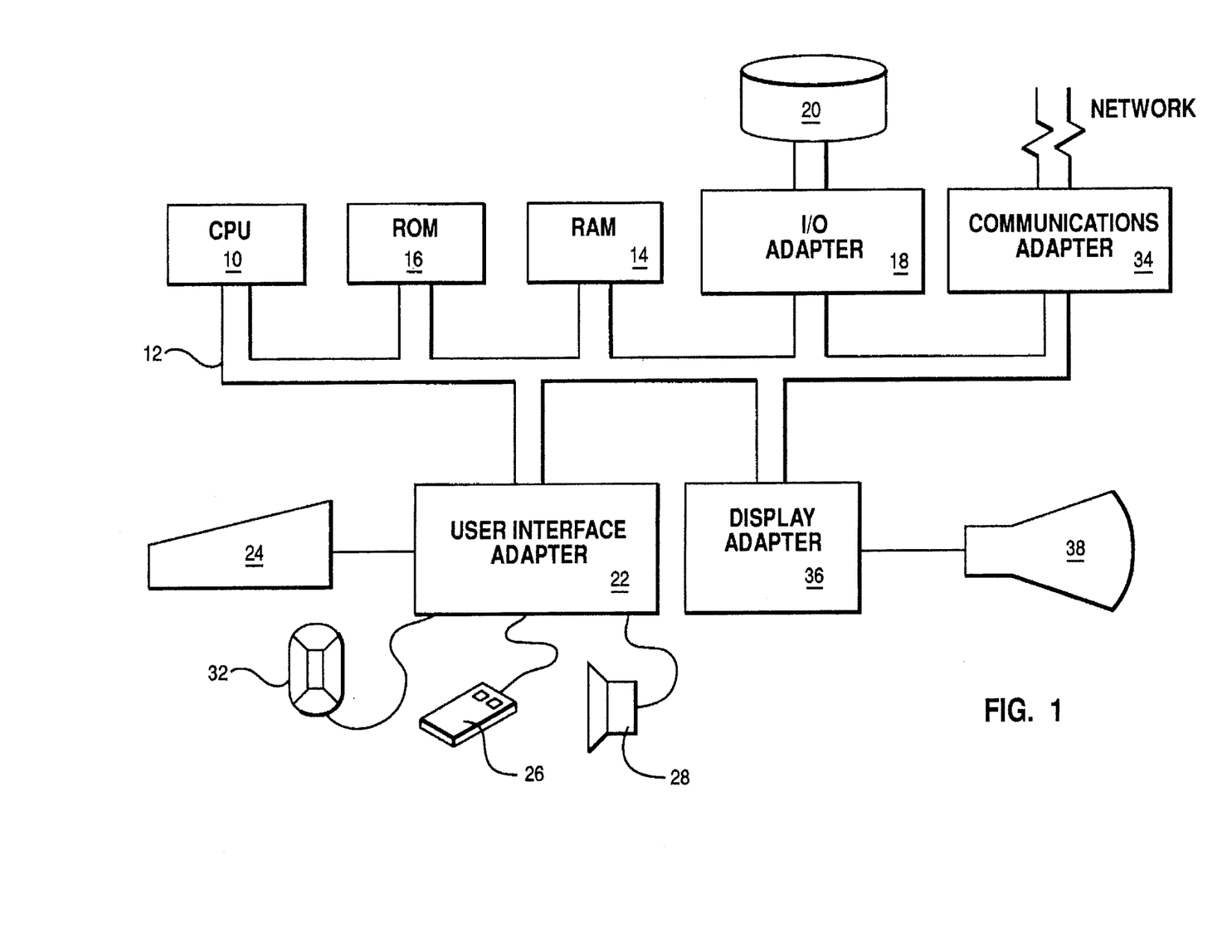
FIG. 1 is a block diagram showing the configuration of a typical workstation in accordance with the subject invention.

Refer now to FIG. 1, which illustrates a typical hardware configuration of a workstation with a central processing unit 10, such as a conventional microprocessor, and a number of other units interconnected via a system bus 12. The workstation shown in FIG. 1 includes a random access memory (RAM) 14, read only memory (ROM) 16, an I/O adapter 18 for connecting peripheral devices such as disk units 20 to the bus, a user interface adapter 22 for connecting a keyboard 24, a mouse 26, a loudspeaker 28, a microphone 32, and/or other user interface devices such as a touch screen device (not shown) to the bus, a communication adapter 34 for connecting the workstation to a data processing network and a display adapter 36 for connecting the bus to a display device 38.

Although FIG. 1 shows a typical 'intelligent' workstation, a workstation may in fact be a dumb terminal with only a limited processing capability, under the control of a host processor. This is made clear in connection with FIG. 2.

Figure 2:
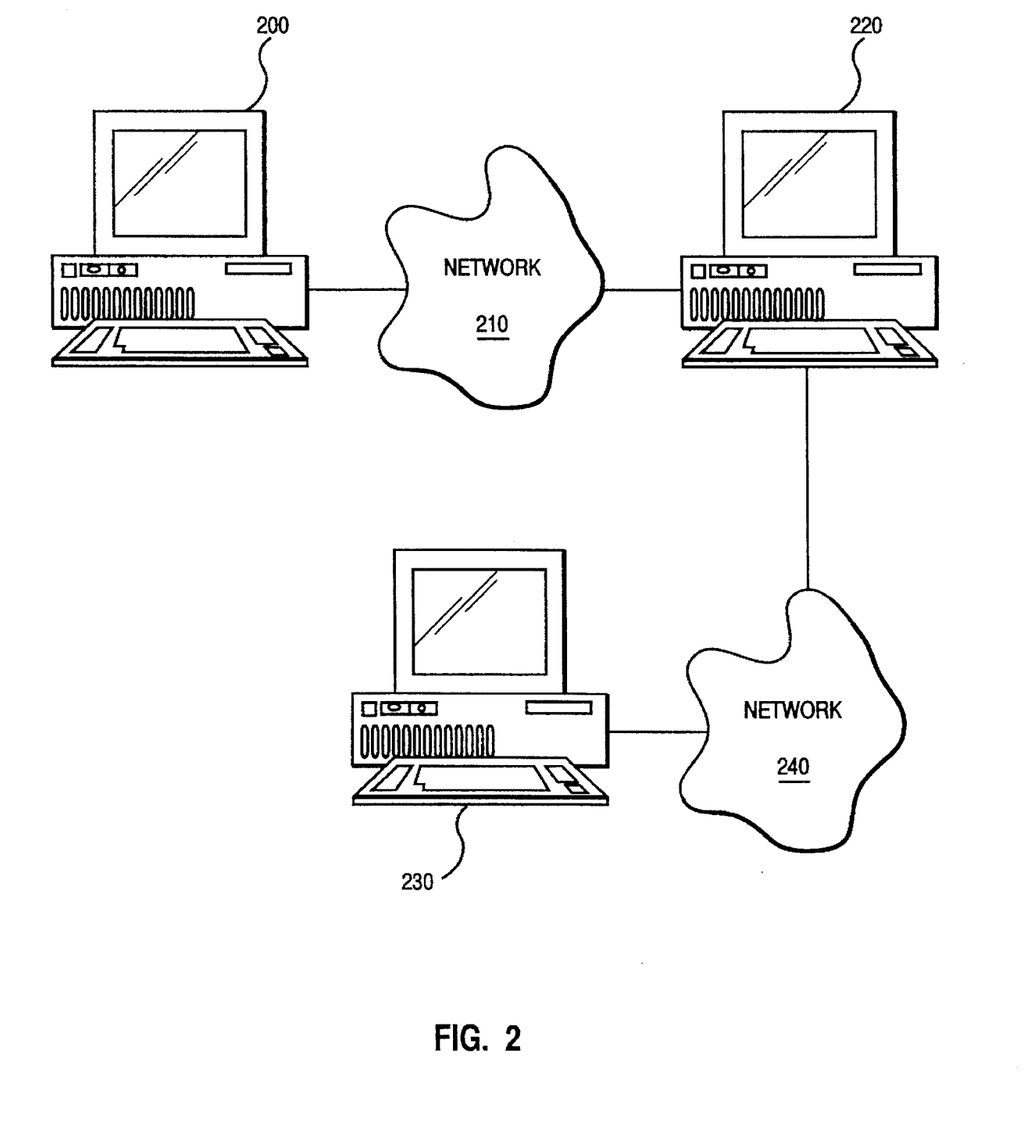
FIG. 2 is a schematic diagram of a data processing system including three workstations interconnected by a network in accordance with the subject invention.

FIG. 2 illustrates a data processing system comprising a number of workstations (here, three workstations 200, 220 and 230) interconnected via a pair of data networks 210 and 240 so as to permit communication between the workstations. It is assumed that the data processing system shown in FIG. 2 is of a type which permits concurrent real time communication between the users. The network operates according to a conventional network protocol, such as the token ring protocol described in *Token Ring Network Architecture Reference*, SC30-3374, IBM 1989 incorporated by reference in its entirety.

FIG. 2 shows just one possible hardware configuration for a data processing network. Other configurations are possible. For example, the data processing system could be based upon a star network, or based upon a host processor connected to a plurality of dumb terminals, or based upon a plurality of remote processors connected by a communication network. The networks could also be based upon the telephone network, an ISDN network or any other 'dial up' networks. The workstations could be located within a single workspace, or within a local area (eg in a building), or could be remote from one another. An excellent source of detailed technical planning information for configuring a network of workstations in accordance with the invention is the IBM Extended Services For OS/2 Example Scenarios Manual (1991). The document is incorporated by reference in its entirety.

Multimedia computing is the processing of various media such as video, waveform audio, musical instrument digital interface (MIDI) streams, animation, graphics and text. Media processing includes the capture, authoring (editing) and playback of media streams as well as other data processing applications. Multimedia documents which are stored on some non-volatile medium, such as a disk, are referred to as recorded multimedia applications. There are also live multimedia applications in which two or more people communicate with each other at the same time using a computer. Live multimedia applications are normally conducted across space and time indicating that live multimedia is inherently distributed. Even recorded multimedia applications require distributed file system services to share large volumes of stored media such as video disk, audio information or computer generated images. Thus, it is critical that a scheduling and coordination solution for multimedia applications include support for a distributed environment.

To reduce their design complexity, most networks are organized as a series of layers, each one built upon its predecessor as described in *Computer Networks*, Tannenbaum, Andrew S., Prentice Hall (1988). The number of layers, the name of each layer, the contents of each layer, and the function of each layer differ from network to network. However, in each network, the purpose of the layers is to offer certain services to the higher layers, shielding those layers from the details of how the offered services are actually implemented. The purpose, function and details of each of the layers and their interaction is set forth in Tannenbaum's book and familiar to communication programmers the world over.

The transport layer accepts data from the session layer, splits it up into smaller units and passes the units to the network layer to ensure that the pieces all arrive at the other end. Details of the transport layer and how it fits into the OSI architecture are shown in FIG. 1–8 of Tannenbaum's book and described in the surrounding pages. ISO/IEC JTC 1/SC 21 Information Retrieval, Transfer and Management for OSI Secretariat: U.S.A. (ANSI) (3294), BASIC REFERENCE MODEL—Management Framework, (7498-4) and Management Information Model (3324) ISO 1989 are various technical standards documents incorporated in their entirety by reference that detail networking architecture.

One way of looking at the transport layer is to regard its primary function as enhancing the Quality of Service (QOS) provided by the network layer. If the subject invention's network reservation service is functioning properly, then the transport service has an easy task. However, if the network service deteriorates, then the transport layer has to intervene to shore up communication services and avoid impact to the network users.

QOS can be characterized by a number of specific parameters. The OSI transport service allows a user to specify preferred, acceptable, and unacceptable values for these parameters when a connection is made. Some of the parameters also apply to connectionless transport. The transport layer examines the parameters, and depending on the kind of network services available to it, determine whether the transport layer can provide the necessary service. QOS parameters are:

Connection Delay

The amount of elapsed time between a transport connection being requested and confirmation being received by the user. As with all parameters dealing with delay, the shorter the delay, the better.

Connection Establishment Failure Probability

The probability of a connection not being established within the maximum establishment delay time. Network congestion, lack of table space, and other internal problems affects this value.

Throughput

Measures the number of bytes of user data transferred per second as measured over a recent time interval. The throughput is measured separately for each direction.

Transit Delay

Measures the time between a message being sent by the transport user on the source machine and its being received by the transport user on the destination machine.

Residual Error Rate

Measures the number of lost or garbled messages as a fraction of the total sent in the sampling period. In theory, the residual error rate should be equal to zero, since it is the job of the transport layer to hide all network layer errors.

Transfer Failure Probability

Measures how well the transport service is living up to its assigned tasks. When a transport connection is established, a given level of throughput, transit delay, and residual error are agreed upon. The transfer failure probability gives the fraction of times that these agreed upon goals were not met during some time period.

Connection Release Delay

The amount of time elapsing between a transport user initiating a release of a connection, and the actual release happening at the end.

Connection Release Failure Probability

The fraction of connection release attempts that did not complete within the agreed upon connection release delay interval.

Protection

Provides a way for the transport user to specify interest in having the transport layer provide protection against unauthorized third parties reading or changing transmitted information.

Priority

Provides a way for a transport user to indicate that some of its connections are more important than other ones. The subject invention is designed to generate priority for application such as multimedia.

Resilience

Gives the probability of the transport layer spontaneously terminating a connection due to internal problems or congestion.

The QOS parameters are specified by a transport application when a connection is requested. Both the desired, minimum and maximum acceptable values are given. In some cases the transport layer immediately recognizes that the values are not achievable. When this occurs, the communication attempt fails and an appropriate exception is noted.

In other cases, the transport layer knows that it cannot achieve the desired goal, but it can achieve a lower, but still acceptable rate. The lower rate, minimum acceptable rate, and maximum acceptable rate are sent to the remote machine requesting the establishment of a connection. If the remote machine cannot handle the proposed value, but can handle a value above the minimum or below the maximum, then it may lower the parameter to its value. If it cannot handle any value above a minimum, then it rejects the connection attempt. Then, the originating transport application is informed of whether the connection was established or rejected.

This process is called open negotiation. Once the options have been negotiated, they remain that way through the life of the connection. The OSI Transport Service Definition (ISO 8072) does not specify the QOS parameter values. These are normally agreed upon by the carrier and the customer. A T-Connect request is employed to initialize communication and the QOS is specified as part of this transaction. Details on the transport primitives are found in the aforementioned reference which is incorporated herein by reference.

Electronic meetings that are held across a distributed system require computer and network resources be reserved hours or days in advance. An advanced reservation system is needed to invoke the OSI services to perform a QOS reservation for a certain hour of a certain day for a fixed duration of time. The invention stores the requirements for a particular session including the QOS parameters, time of the connection, day of the connection, duration of the connection and various applications that must be connected in a file on each of the connected user's computers 200, 220 and 230 of FIG. 2. The file is stored in non-volatile memory to avoid problems with power outs.

A scheduled connection is necessary since hours or days may elapse between when an electronic meeting is scheduled and when the network and computer resources must be reserved. A persistent connection must be established since a fault may occur during the time that the electronic meeting is scheduled. The transport application, transport service, computer workstation(s) or network could stop and be restated many times during the interim. A transient fault should not impair a future connection so long as all resources are operational when data transfers are scheduled to begin. The invention stores all necessary state information for a connection in a non-volatile medium as described earlier and employs recovery logic to reinitiate communication should a problem occur. In addition to recovery, scheduling and notification must occur.

Below the transport and network layers are the link or MAC layers in the OSI and IEEE 802 reference models. Some MAC protocols, such as synchronous FDDI, provide guarantees for throughput, delay and delay variation to applications. Other MACs, such as the token ring and token bus have architected priority mechanisms which can support quality of service guarantees (throughput, delay, etc.) when the subject invention is employed.

Priority Assurance

The crux of priority assurance on a shared transmission medium, such as a ring or bus, is in communicating the state of the shared medium to any and all stations connected to the shared medium. One possible embodiment is to avoid the need for such communication of bandwidth management information, and simply partition the bandwidth among stations on the ring or bus: one station may, for example, have dedicated use of 1.2 megabits per second, and another may have 5 megabits per second: In this scheme, if a station is not using its maximum allowable bandwidth, no other station can. This potential disuse of available bandwidth is the drawback of the static, bandwidth partitioning approach.

If bandwidth is to be dynamically allocated and deallocated in such a way that if one station is not using the bandwidth, another station may attempt to reserve it, then some means is needed whereby each station can determine when to permit a new connection requiring a bandwidth allocation, and a means for letting other stations know about the allocation of shared medium bandwidth and the subsequent deallocation when the connection is terminated. The International Standards Organization's (ISO) Open Systems Interconnection (OSI) Model for Systems Management permits applications employing systems management facilities to define "Management Information Base", or MIB, objects which resemble static programming language variables or database elements. The MIB objects in the OSI model, and products based upon this model support operations such as SET, which sets the value of the MIB object, the GET operation retrieves the value of the MIB object and a third operation called THRESHOLD which results in a process being notified whenever a MIB object is SET and the resulting value exceeds the THRESHOLD value. Operations on a MIB object can be "atomic" meaning that one process may GET and SET the object as a single operation thereby serializing access to the object for the duration of the operations. Such serialization is needed when there are multiple stations that may concurrently attempt to update the object, and this is usually the case on shared media networks such as the token ring or token bus.

Priority assurance is a critical factor to assure QOS. Priority assurance is enabled by the operation of a component that can be implemented in hardware logic or software. The component regulates access to the priority queue or transmit channel that is attached to the shared medium local area network section. All access to the priority queue or transmit channel must pass through this component, thus subjecting all communication transactions to rejection or tracking by the component.

The component offers at least three functions to all users of the priority queue or transmit channel: Bandwidth allocation accepts a quality of service vector that includes throughput over some interval (e.g., bits per second), bandwidth deallocation accepts the QOS vector and release resources that have been allocated, and priority transmission in which a packet or frame that is identified as having a priority reservation is accepted and transmitted. In each of the three cases, the operation may fail for a number of standard reasons:

(a) If there is not enough bandwidth available on the shared medium, or if the station in question has reached its total allocation, then the bandwidth allocation request may fail;

(b) the bandwidth deallocation request may fail if the request attempts to exceed the total amount that has been reserved, or is otherwise erroneous; and (c) the transmit may fail if the sender's rate of sending packets (frames) is greater than the rate negotiated during the bandwidth allocation request, or the packet (frame) size exceeds an allowable maximum.

Among the key features of the invention is a bandwidth Management Information Base (MIB). The MIB contains throughput and delay objects that are read (GET) or written to (SET) by one or more stations. The delay MIB object is based on the number of stations on the ring currently sending priority frames (determined statically through configuration or dynamically using a systems management MIB object called current_number_of_priority_stations), and a MIB object named maximum_frame_size.

The station's bandwidth manager component initializes a routing control (RC) field of Medium Access Control (MAC) frames to maximum_frame_size. Since this field is employed by other components, such as bridges, to constrain the maximum frame size, the bandwidth manager will only change the AC to a lower value, as opposed to a higher value, prior to passing a frame to a MAC application. Upon receiving a frame, zero priority or non-zero priority, the bandwidth manager checks to see if its length exceeds maximum_frame_size. If it does, the bandwidth manager interrogates another MIB object correction_mode; if correction_mode is set to one, the frame will be rejected, the sending process notified, and the MIB object maximum_frame_size_exceeded is incremented by one; if correction_mode is not set to one, then the frame will be transmitted normally after maximum_frame_size_exceeded is incremented. The user may optionally apply a threshold value to any counter, such as the maximum_frame_size_exceeded counter, and be notified when the counter exceeds a threshold value.

The bandwidth manager also inspects the priority field (AC in the Token Ring) of the frame and if it is high-priority (greater than zero in the Token Ring case), then the bandwidth manager verifies the sender is within its negotiated rate. There may be multiple senders in the same workstation sending frames out of the same network device to the same shared transmission media. Thus, the bandwidth manager keeps MIB objects for each such application (e.g., NetBIOS, TCP/IP, IPX/SPX), and ensures that each application stays within its negotiated rate and does not send beyond its rate and thereby potentially degrade the performance of other applications in the workstation or in some other workstation on the shared medium (e.g., Token Ring).

An application increases its bandwidth allotment via a bandwidth manager command allocate-bandwidth which, when successful, results in that application's rate increasing by the requested amount, averaged or maximum over a negotiated time interval. An application is able to decrease its bandwidth allotment using the bandwidth manager command, deallocate-bandwidth, which results in the application's rate being decreased by the released amount. An embodiment of the bandwidth manager's bandwidth allocator component (i.e., subnetwork bandwidth management component) can be as simple as a preconfigured value that is set prior to the station's insertion on the LAN and unchanging. More powerful tools such as OSI systems management can be used by the bandwidth allocator so that no special configuration of reserved bandwidth is needed, and a station's bandwidth can be dynamically increased using SET and GET operations and OSI systems management protocol, called Common Management Information Protocol (CMIP).

As discussed above, FIG. 2 illustrates several workstations connected to a shared transmission media, which in this figure is a ring such as the IBM or IEEE 802.5 Token Ring. Each station must obey an access protocol to ensure orderly transmission and reception of medium access control (MAC) frames.

Figure 3:
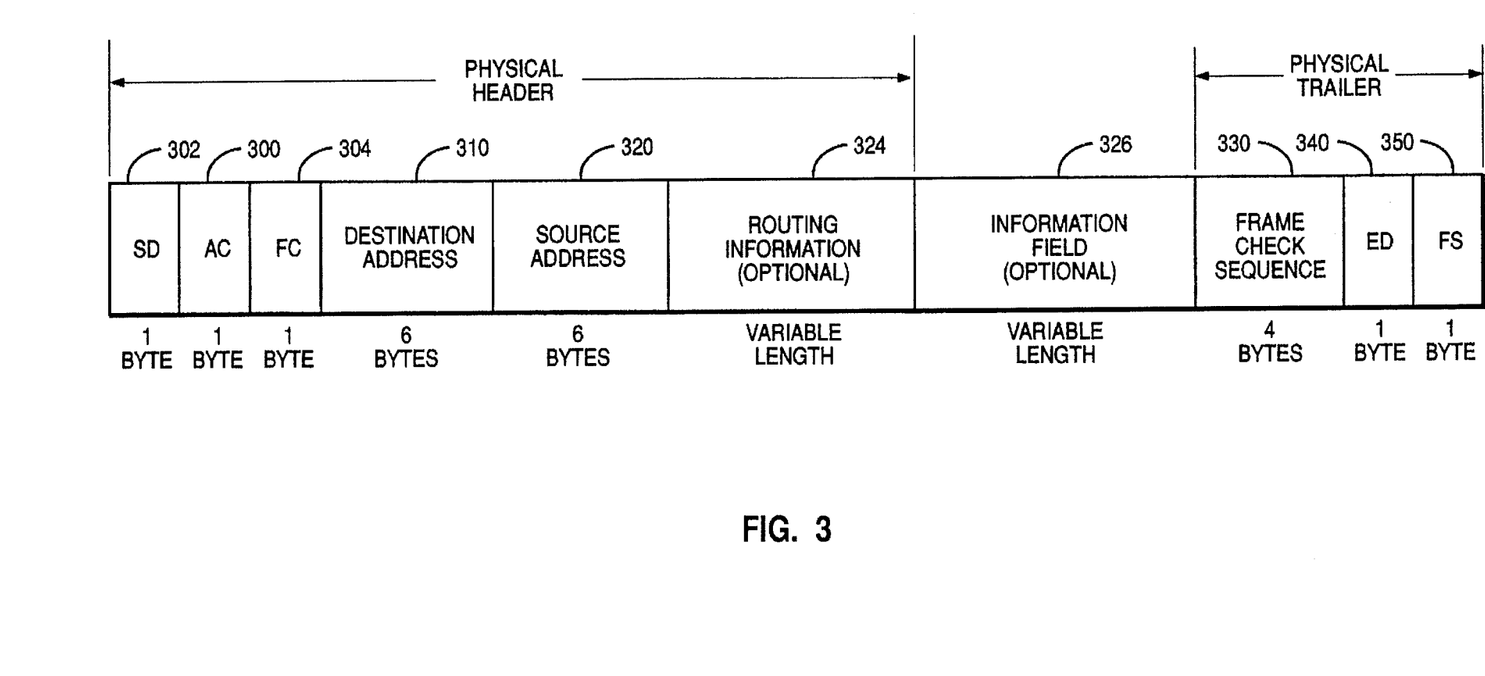
FIG. 3 is an illustration of the Medium Access Control (MAC) frame format in accordance with the subject invention.
Figure 4A:
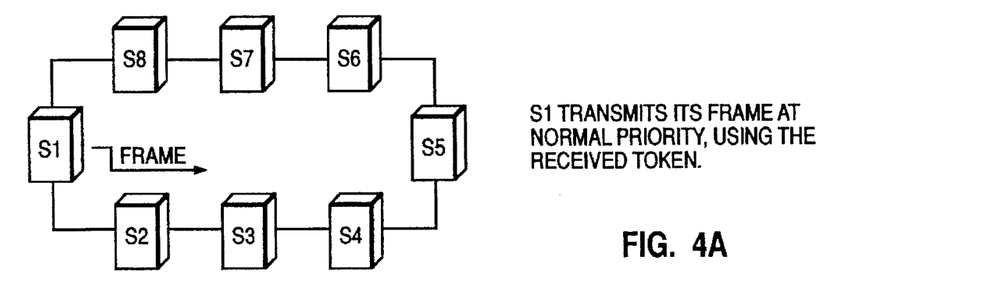
FIGS. 4A–D are illustrations of priority reservation occurring on a token ring in accordance with the subject invention.
Figure 4B:
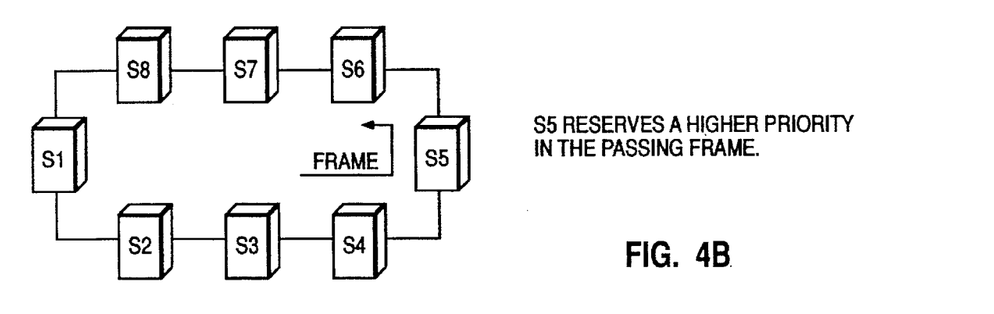
Figure 4C:
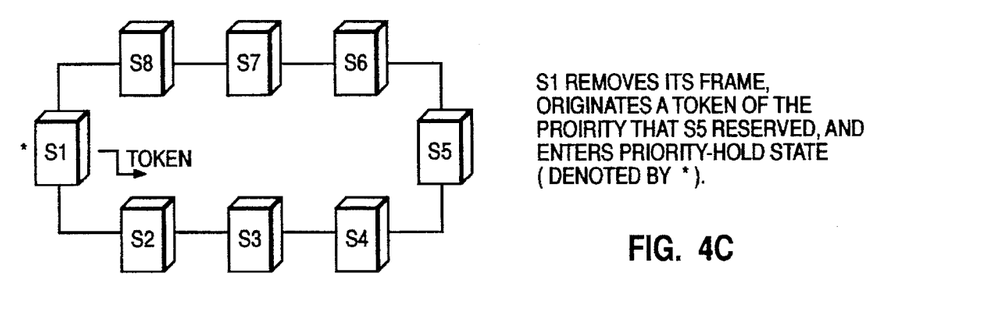
Figure 4D:
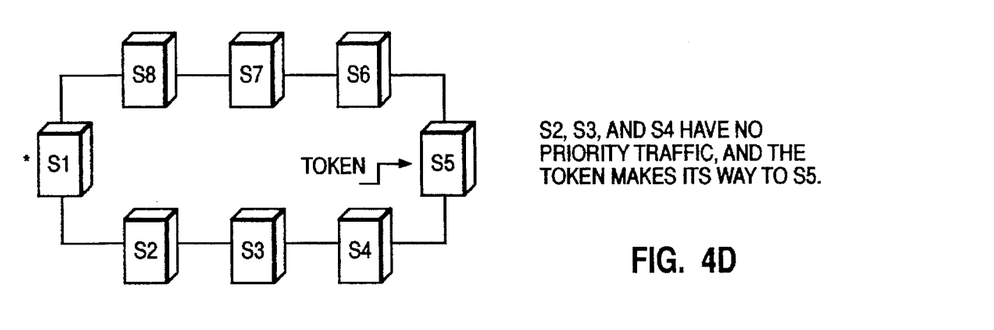

FIG. 3 illustrates the fields of the Token Ring frame. The AC field 300 is the access control where a workstation may set a value in the passing frame in order to reserve the token when it is released by the sending station after its frame traverses the ring exactly once. Access priority is not the same as message priority within a node. The priority of a token or frame is indicated in the first three bits of the access control field. Any reservation for a different priority is indicated in the last three bits of the same field. A ring station uses the reservation bits to request that a token originated on the ring be at the requested priority.

A ring station can transmit a frame at a given priority using any available token with a priority less than or equal to that of the frame. If an appropriate token is not available, the ring station may reserve a token of the required priority in a passing token or frame as follows:

if another ring station has reserved an equal or higher priority, then the ring station cannot make a reservation in the frame or token.

if the reservation bits have not been set, or if they have been set to a lower priority than that required by the ring station, it sets the reservation bits to its required priority.

The starting delimiter (SD) 302 is a single byte indicative of the starting delimiter of the transmitted communication buffer. All valid frames and tokens start with this byte. FC 304 is the frame control field, ED 340 is the ending delimiter, and FS 350 is the frame status field. The destination address 310 is the address for delivery of the communication buffer. The source address 320 is the originating address of the communication buffer. The information field 326 is included for optional delivery information or other communication information. The frame check sequence 326 covers the frame control field, the destination and source addresses, the optional routing information field, the information field and the frame check sequence.

FIGS. 4A–D illustrates the reservation process on a Token Ring in accordance with the subject invention. A station may reserve a future token at a certain priority, and the token priority can be increased and reset to its original value. Moreover, the use of priority by individual stations for transmitting frames is unconstrained. If all stations transmitted all frames at a given priority, there would be no change in the functioning of the ring. And if access to priority transmission is not regulated, there will be no way to guarantee a certain throughput rate, nor bound the amount of time it will take for a station having a priority frame to gain access to the ring.

Figure 5:
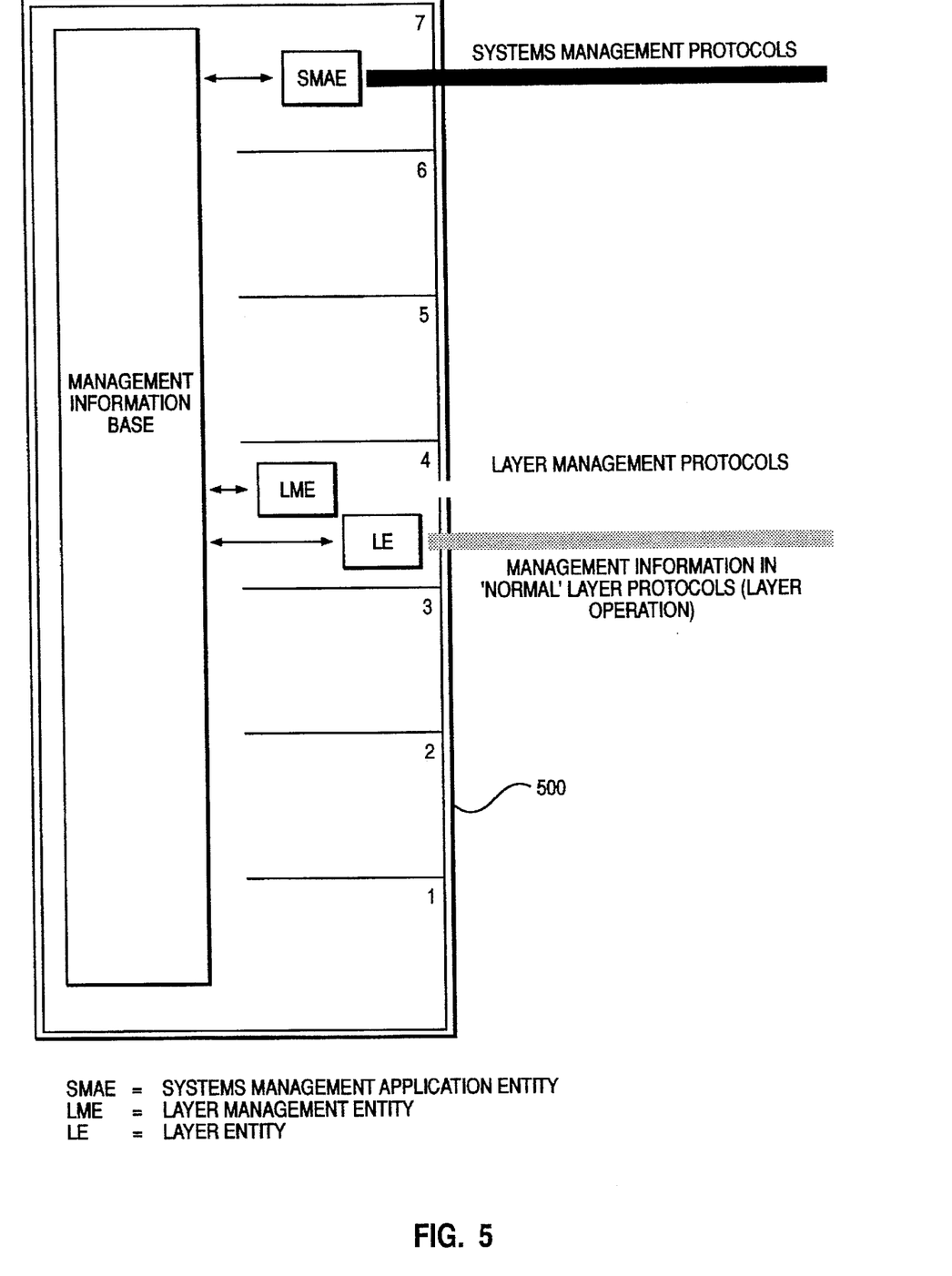
FIG. 5 illustrates the Open Systems Interconnect (OSI) systems management structure of a Management Information Base (MIB) in accordance with the subject invention.

FIG. 5 is a block diagram of OSI system management. Management of bandwidth on a shared transmission medium, such as the IBM Token Ring, can be considered as a systems management function. The layer of interest is OSI layer 2 500, called the "Link Layer" in OSI parlance and the MAC, or medium access control layer by the IEEE. The Management Information Base of interest includes a throughput object for each user of the MAC, this object's name is "negotiated_rate" and a second throughput object for each MAC user called "actual_rate". Similarly, there is a time interval object called time_interval, and there is a last time the clock was read for each application called last_time. Access to the system clock is also assumed, though the system clock is not part of the MIB. Other objects that can be included in the MIB are correction_mode, maximum_priority_frame_size, maximum_frame_size as well as rate_exceeded, and frame_size_exceeded counters.

Figure 6:
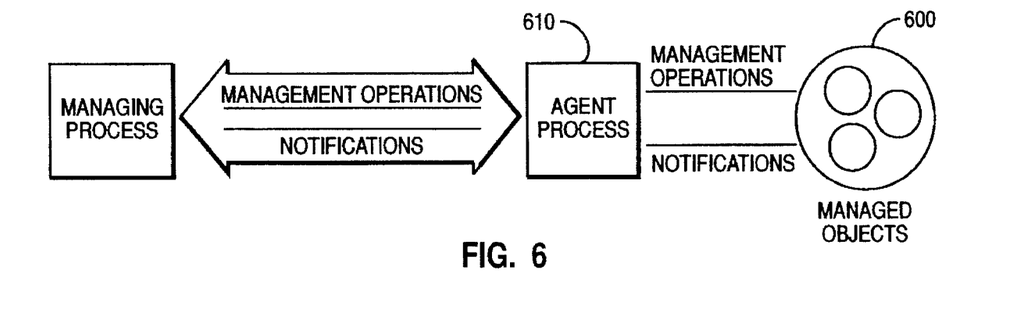
FIG. 6 illustrates the relationship of Open Systems Interconnect (OSI) management procedures, agent processes and managed object operations in accordance with the subject invention.

FIG. 6 illustrates a MIB 600 and the agents which act upon it. A bandwidth allocation services, such as NetBIOS or TCP/IP might employ bandwidth allocation services. These operations include capability to read (GET) and update (SET) the bandwidth management MIB objects. These objects are implemented through a systems management product, such as Simple Network Management Protocol or an OSI CMIP-based protocol.

Figure 7:
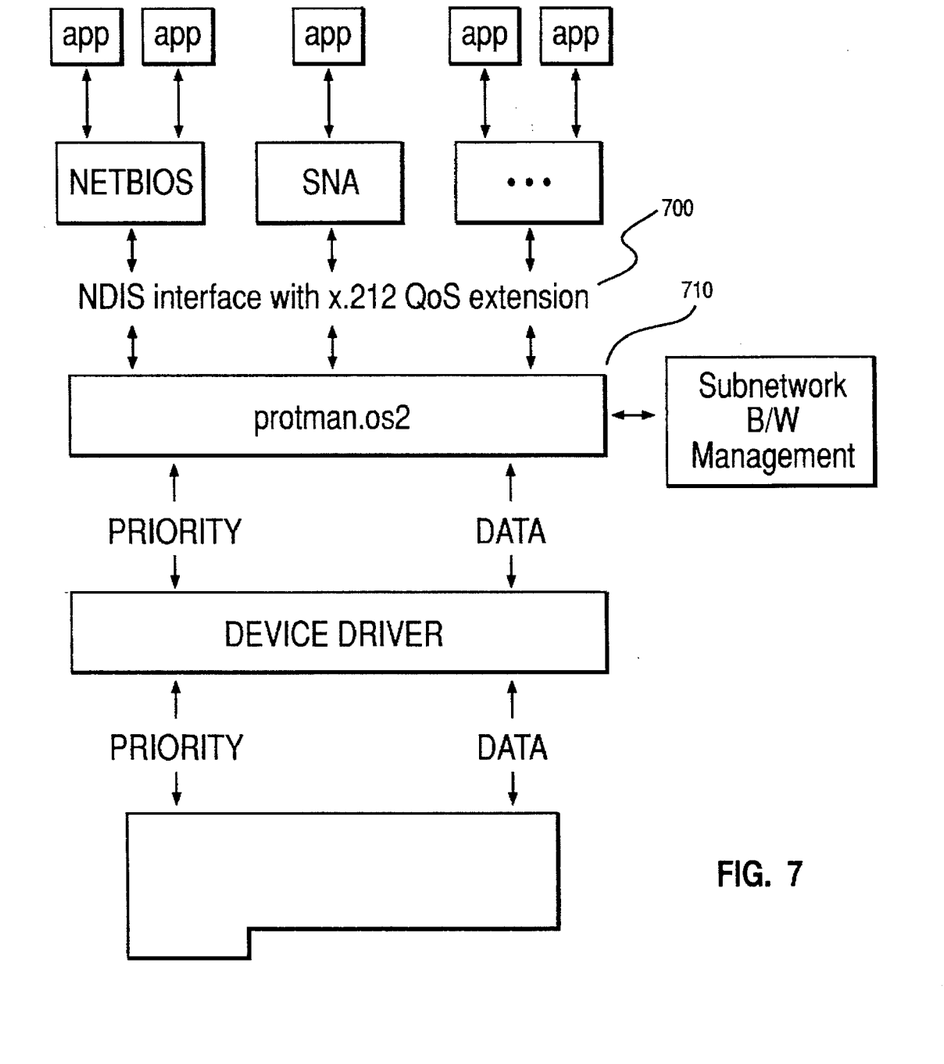
FIG. 7 is a block diagram in accordance with the subject invention.

FIG. 7 shows a typical component block diagram found in IBM OS/2 and DOS as well as Microsoft DOS/Windows workstations. The NDIS 700 interface is the Network Driver Interface Specification which is an industry-standard MAC interface. The "Vectoring" component 710 is interposed between the device driver and the protocol "stack" of the device: vectoring is the practice of permitting several products to run over a device which was only designed to support a single product.

The present invention utilizes the vectoring component (called "protman.os2" in OS/2 implementations) as a point through which all transmitted frames must pass en-route to the network device. This component can be used to set maximum frame sizes in the RC field of the MAC frame in the IEEE 802.5 embodiment, and this component inspects the length field of each transmitted frame to determine compliance with the previously-set maximum rate. All priority frames pass through this component, and they are recognizable in the Token Ring embodiment by the value of the AC field of the MAC frame.

Figure 8:
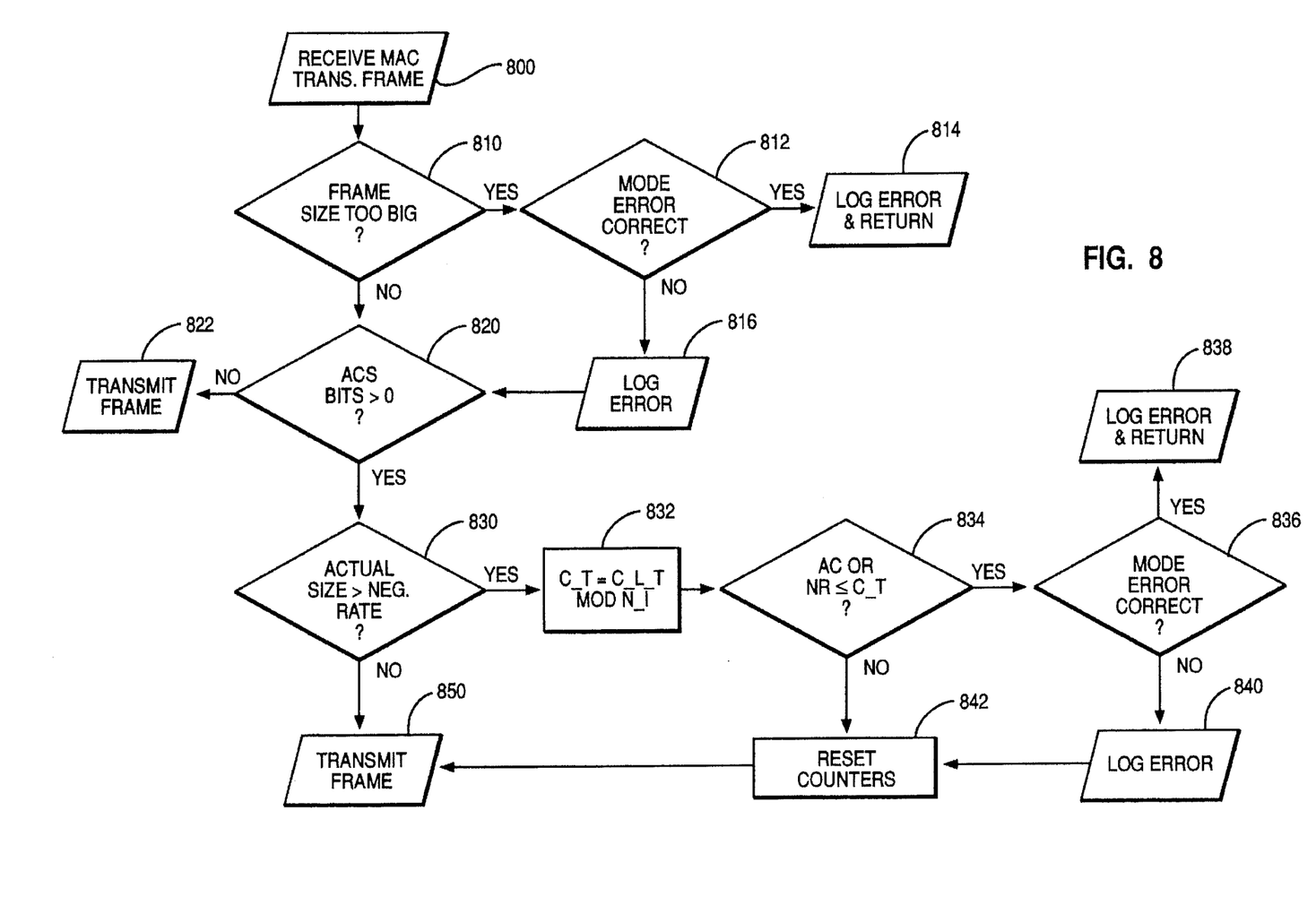
FIG. 8 is a flow chart detailing the logic in accordance with the subject invention.

FIG. 8 is a flow chart that specifies the logic of the "Vectoring and Bandwidth Management" component showed in FIG. 7. The component receives transmission frames as shown in input block 800, checks the length of all frames as depicted in decision block 810, increments a MIB object count when the length exceeds the maximum as shown in decision block 812 and output block 814, and optionally rejects the frame when the length exceeds the maximum_frame_size MIB object as shown in decision block 810. Also shown in the flow of FIG. 8, priority frames are metered to ensure that the sending application, a protocol product such as NetBIOS, is not incorrectly exceeding its negotiated rate of flow as shown in decision block 830. The "protocol_id" field of NDIS is used for associating a particular MIB with a particular application. A simple metering algorithm is used to ensure that a particular application is within its negotiated rate, and this ensures that the QOS of other applications in the workstation or in other workstations on the ring will not be "robbed" of bandwidth by a poorly behaved or erroneous process. In the present embodiment, the negotiated rate is taken to be a maximum, but a negotiated_average_rate can also be used. In every case, the MIB objects of a particular application are undefined until that application registers with NDIS and obtains a protocol_id. When this occurs, the MIB object counters are set to zero as is the throughput count as shown in function block 842.

Delay statistics are determined based on the maximum_frame_size MIB object (there may be maximum_data_frame_size for non-priority traffic and maximum_priority_frame_size for the priority traffic). Also configured or maintained dynamically is the data_station_count and priority_station_count which, together with the maximum frame sizes, can be employed to estimate worst case delay.

While the invention has been described in terms of a preferred embodiment in a specific system environment, those skilled in the art recognize that the invention can be practiced, with modification, in other and different hardware and software environments within the spirit and scope of the appended claims.

Having thus described our invention, what we claim as new, and desire to secure by Letters Patent is:

1. An apparatus for transmitting information through a network of interconnected computers, comprising:
    (a) means for storing network information in each one of said interconnected computers indicative of the quality of service required for a plurality of transmitting applications within said computers, including a priority for information to be transmitted in a token ring protocol; and
    (b) means, connected to said means for storing, for allocating a frame size for each one of said interconnected computers for said plurality of transmitting applications based on the information negotiated by a transport medium and said network of interconnected computers and the priority in said token ring protocol.

2. An apparatus as recited in claim 1, including means for detecting by each of said interconnected computers when an actual transmission rate for said plurality of transmitting applications exceeds the quality of service required.

3. An apparatus as recited in claim 2, including means for incrementing a counter in said means for storing information within each of said interconnected computers when the actual transmission rate for said plurality of transmitting applications exceeds the quality of service required.

4. An apparatus as recited in claim 3, including means for testing the counter and alarming based on the counter exceeding a predefined threshold for said plurality of transmitting applications.

5. An apparatus as recited in claim 1, in which the network is an open system interconnect network.

6. An apparatus as recited in claim 1, in which the network is a local area network.

7. An apparatus as recited in claim 1, in which the network is an integrated services digital network.

8. A method for transmitting information through a network of interconnected computers, comprising the steps of:
    (a) storing network information in each one of said interconnected computers in a vectoring component indicative of the quality of service required for a plurality of transmitting applications within said computers, including a priority for information to be transmitted in a token ring protocol; and
    (b) allocating a frame size for each one of said interconnected computers for said plurality of transmitting applications in said vectoring component based on the information negotiated by a transport medium and said network of interconnected computers and the priority in said token ring protocol.

9. A method as recited in claim 8, including the step of detecting by each of said interconnected computers when an actual transmission rate for said plurality of transmitting applications exceeds the quality of service required.

10. A method as recited in claim 9, including the step of incrementing a counter in said stored information within each of said interconnected computers when the actual transmission rate for said plurality of transmitting applications exceeds the quality of service required.

11. A method as recited in claim 10, including the step of testing the counter and alarming based on the counter exceeding a predefined threshold for said plurality of transmitting applications.

12. A method as recited in claim 8, wherein the network is an open system interconnect network.

13. A method as recited in claim 8, wherein the network is a local area network.

14. A method as recited in claim 8, wherein the network is an integrated systems distributed network.

15. A method of monitoring the rate and size of communication transactions of a network, said network including a plurality of workstations connected thereto, comprising:
    providing within each of said plurality of workstations a single access regulator having a vectoring component attached to said network;
    receiving by said access regulator a communication transaction from a plurality of transmitting applications to be directed to one of said plurality of workstations on said network;
    dynamically allocating a frame size in said vectoring component based on the communication transaction from said plurality of transmitting applications and a priority of a selected one of said workstations corresponding to a quality of assurance value negotiated by said access regulator and said one of said selected workstations; and
    monitoring the communication transactions of said network by said access regulator and comparing the communication transaction of said selected one of said workstations with said quality of assurance value negotiated by said one of said selected workstations.

16. A method as in claim 15 wherein said step of monitoring includes the step of stopping the transaction of said selected one of said workstations when the quality of assurance value detected by said vectoring component is exceeded for said plurality of transmitting applications.

17. A method as in claim 15 wherein said step of monitoring includes the step of recording and reporting transaction to said vectoring component of said selected one of said workstations when the quality of assurance value is exceeded for said plurality of transmitting applications.

18. A method as in claim 15 wherein the communication transactions of said network is in a token ring protocol.

19. A method as in claim 15 wherein the step of dynamically allocating a frame size includes the step of negotiating an increase in the quality of service value by said vectoring component in said selected one of said workstations between a transport medium.

* * * * *